US009947054B2

(12) United States Patent
Kavis et al.

(10) Patent No.: US 9,947,054 B2
(45) Date of Patent: Apr. 17, 2018

(54) REAL-TIME TRANSACTION DATA PROCESSING AND REPORTING PLATFORM

(71) Applicant: CAROLINA COUPON CLEARING, INC., Winston-Salem, NC (US)

(72) Inventors: Michael J. Kavis, Parrish, FL (US); L. David Mounts, Winston Salem, NC (US); Jeffrey Toewe, Winston Salem, NC (US); Timothy P. Wilkinson, Apalachin, NY (US)

(73) Assignee: CAROLINA COUPON CLEARING, INC., Winston-Salem, NC (US)

( * ) Notice: Subject to any disclaimer, the term of this patent is extended or adjusted under 35 U.S.C. 154(b) by 0 days.

(21) Appl. No.: 13/857,865

(22) Filed: Apr. 5, 2013

(65) Prior Publication Data

US 2014/0207592 A1 Jul. 24, 2014

Related U.S. Application Data

(60) Provisional application No. 61/621,026, filed on Apr. 6, 2012.

(51) Int. Cl.
*G06Q 40/00* (2012.01)
*G06Q 20/20* (2012.01)

(52) U.S. Cl.
CPC .......... *G06Q 40/12* (2013.12); *G06Q 20/202* (2013.01); *G06Q 20/209* (2013.01)

(58) Field of Classification Search
CPC ...... G06Q 40/00; G06Q 40/12; G06Q 20/202; G06Q 20/209
USPC ....... 705/21, 16, 22, 35, 14.1; 709/203, 246; 715/200
See application file for complete search history.

(56) References Cited

U.S. PATENT DOCUMENTS

| | | | | |
|---|---|---|---|---|
| 6,324,525 | B1 * | 11/2001 | Kramer et al. | 705/40 |
| 7,349,884 | B1 * | 3/2008 | Odom et al. | 705/40 |
| 7,774,251 | B1 * | 8/2010 | Prasad et al. | 705/35 |
| 7,775,426 | B2 * | 8/2010 | Paul et al. | 235/379 |
| 8,204,809 | B1 * | 6/2012 | Wise | 705/35 |
| 2003/0197782 | A1 * | 10/2003 | Ashe | G07G 1/14 348/150 |
| 2004/0078332 | A1 * | 4/2004 | Ferguson | G06Q 20/04 705/41 |

(Continued)

*Primary Examiner* — Vanel Frenel
(74) *Attorney, Agent, or Firm* — Allen, Dyer, Doppelt + Gilchrist, P.A.

(57) ABSTRACT

A processing server may receive transaction data from one or more point of sale (POS) terminals in near real-time. Transaction data received from each of the POS terminals may be in a format that is specific to the POS terminal. Upon receiving the transaction data having the POS specific format, the processing server may convert the transaction data to a common format that is compatible with the operations of the processing server. Further, the processing server may index the converted transaction data into one or more categories. Responsive to indexing, the processing server may generate aggregate data from the indexed transaction data. Further, the processing server may receive a request for a data report associated with the aggregate data. Responsive to receiving the request, the processing server may generate the data report, format the data report to match a user preference, and transmit the data report for presentation.

16 Claims, 13 Drawing Sheets

Manufacturer 108a

Retailer 108b

User 108n

Processing Cloud/ Virtual Private Network 102

Point of Sale (POS) Device 110

100

(56) References Cited

U.S. PATENT DOCUMENTS

2004/0168115 A1* 8/2004 Bauernschmidt et al. ... 715/500
2004/0254881 A1* 12/2004 Kumar et al. .................. 705/40
2008/0189184 A1* 8/2008 Kubo et al. ..................... 705/16
2008/0275779 A1* 11/2008 Lakshminarayanan ......... 705/14
2009/0006156 A1* 1/2009 Hunt et al. ........................ 705/7
2009/0006203 A1* 1/2009 Fordyce et al. ................ 705/14
2011/0093344 A1* 4/2011 Burke et al. ............... 705/14.65
2011/0119163 A1* 5/2011 Smith ............................ 705/30
2011/0202413 A1* 8/2011 Stewart et al. ................. 705/16
2013/0185349 A1* 7/2013 Broda ................... G06F 9/4443 709/203
2013/0290187 A1* 10/2013 Itwaru ................ G06Q 20/3227 705/44
2014/0129438 A1* 5/2014 Desai ..................... G06Q 20/08 705/41
2014/0207592 A1* 7/2014 Kavis et al. .................... 705/21
2014/0337117 A1* 11/2014 Besecker et al. .......... 705/14.38
2015/0332254 A1* 11/2015 Desai ........................ G06F 8/60 705/41

* cited by examiner

FIG. 12

REAL-TIME TRANSACTION DATA PROCESSING AND REPORTING PLATFORM

CROSS REFERENCE TO RELATED APPLICATIONS

This application claims priority to U.S. Provisional Patent Application No. 61/621,026 filed Apr. 6, 2012 in the names of Michael J. Kavis, and L. David Mounts and entitled "Real Time Transaction Platform," the entire contents of which are hereby incorporated herein by reference.

FIELD OF INVENTION

This disclosure relates generally to a technical field of data processing and analysis and, in one example embodiment, to a system, method and apparatus for real-time transaction data processing and reporting platform.

BACKGROUND

Businesses may leverage transaction data from numerous data sources all over the world to obtain business performance metrics, such as product performance, profitability, margins, and other critical metrics, and consumer behavior information. Such business performance metrics and consumer behavior information may in turn be used to optimize business operations and improve profits. Each data source may generate a large volume of data that need to be processed in a timely manner to benefit from the data. However, businesses may lack the data processing power, capacity and infrastructure required to address the large volume of data. Upgrading existing data processing infrastructure to include additional processing power may be time consuming and cost-intensive. Further, even if the large volume of data can be handled, the data from the data sources may be incompatible with data systems associated with the businesses, and business may need complex conversion mechanisms to convert the data from each data source to a form that is understandable by the data systems of the business for analysis.

In addition, even if the business can efficiently process the large volumes of the data and convert the data effectively, conventional technology may lack ability to provide the data in near real-time. Instead, conventional technology may be equipped to provide the data in a batch fashion by the next day, within a week, within a month, or even by end of a business quarter. Said limitations of the conventional technology may in turn limit the analytical and data mining capabilities of businesses to leverage the data in a timely manner to benefit from the data. For example, businesses may have to wait for a month before they can obtain a product performance analysis and in a highly competitive environment, by the time they receive the analysis the product performance trends may have changed. Such limitations may limit the ability of businesses to foresee trends and take necessary proactive measure to maximize benefits and minimize losses. Thus, there is a need for a technology that provides real-time transaction data processing and reporting.

SUMMARY

Disclosed are a system, a method and an apparatus for real-time transaction data and reporting platform. In one aspect, a method includes receiving, by a computer, data from a plurality of data sources. The data from each of the plurality of data sources is in a format associated with the respective data source. Further, the method includes converting the received data from each of the plurality of data sources from a format specific to the respective data source to a common format. Furthermore, the method includes generating one or more aggregate data from the data having the common format. In addition, the method includes receiving, at the computer, a request for a data report associated with the one or more aggregate data. Responsive to receiving the request, the method includes generating the data report from the one or more aggregate data and transmitting the data report for presentation.

In another aspect, a server includes include a memory and a processor. The processor is configured to receive transaction data from a plurality of point of sale (POS) devices. The data from each of the plurality of POS devices is in a format associated with the respective POS device. Further, the processor is configured to convert the received transaction data from each of the plurality of POS devices that has a format associated with the respective POS device to a format associated with the server. Furthermore, the processor is configured to generate one or more aggregate data from the transaction data having a format associated with the server. In addition, the processor is configured to receive a request for a data report associated with the one or more aggregate data. Responsive to receiving the request, the processor is configured to generate the data report from the one or more aggregate data. In yet another aspect, a system comprises a computer. The computer is configured to receive transaction data from a plurality of POS devices. The data from each of the plurality of POS devices is in a format associated with the respective POS device. Further, the computer is configured to convert the received transaction data from a format associated with the respective POS device to a format associated with the server. Further, the computer is configured to generate one or more aggregate data from the transaction data having the format associated with the server. In addition, the computer is configured to receive a request for a data report associated with one or more aggregate data. Responsive to receiving the request, the computer is configured to generate the data report from the one or more aggregate data and transmit the data report for presentation.

These and other aspects, features and embodiments of the invention will become apparent to a person of ordinary skill in the art upon consideration of the following detailed description of illustrated embodiments exemplifying the best mode for carrying out the invention as presently perceived.

BRIEF DESCRIPTION OF THE FIGURES

Example embodiments are illustrated by way of example and not limitation in the figures of the accompanying drawings, in which:

FIG. 12 illustrates an example data report presented in an example user interface, according to certain exemplary embodiments of the present invention.

Figure 1:
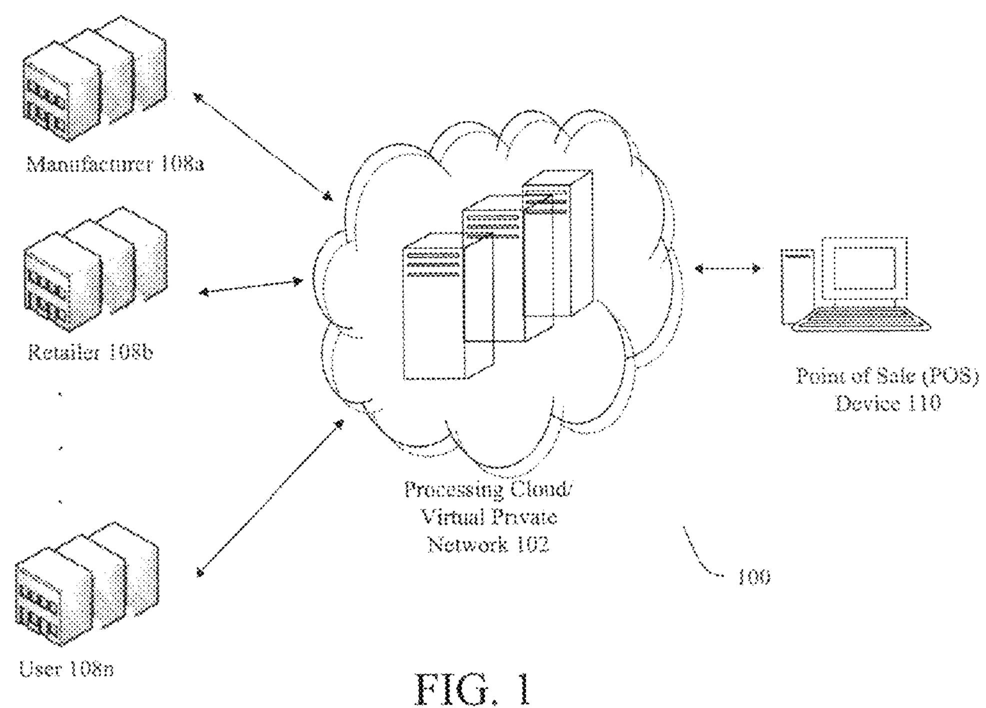
FIG. 1 illustrates an exemplary operating environment of a real-time transaction data processing and reporting system, according to certain exemplary embodiments of the present invention.

Many aspects of the invention can be better understood with reference to the above drawings. The elements and features shown in the drawings are not to scale, emphasis instead being placed upon clearly illustrating the principles of example embodiments of the present invention. Moreover, certain dimensions may be exaggerated to help visually convey such principles. In the drawings, reference numerals designate like or corresponding, but not necessarily identical, elements throughout the several views. Other features of the present embodiments will be apparent from the Detailed Description that follows.

DETAILED DESCRIPTION

Disclosed are a system, a method and an apparatus for a real-time transaction data processing and reporting platform. It will be appreciated that the various embodiments discussed herein need not necessarily belong to the same group of exemplary embodiments, and may be grouped into various other embodiments not explicitly disclosed herein. In the following description, for purposes of explanation, numerous specific details are set forth in order to provide a thorough understanding of the various embodiments.

The term "aggregate data" as used herein can generally refer to any appropriate summarized representation of a data set. Data from a wide variety of sources may be categorized into separate tables. Further, data elements from one or more tables may be processed and combined to form aggregate data. In one embodiment, aggregate data may refer to a single data element that summarizes one or more data elements. In another embodiment, aggregate data may refer to a collection of one or more data elements that are related to each other. In an example embodiment, the aggregate data may be used for analytics to spot trends and patterns.

In one embodiment, the aggregate data may be computed in real-time, i.e., as and when the data set is received and/or as and when a request for the aggregate data is received. In another embodiment, the aggregate data may be pre-computed. In some embodiments, when there is a new entry into the data set, the computation for the aggregate data is updated to include the new entry resulting in an updated aggregate data. As described herein, aggregate data can include, but is not limited to, aggregate data representative of product sales of all products that are listed under a brand label, aggregate data representative of product sales of a particular product, for example product X, and aggregate data representative of product sales in each department in a store.

In an example embodiment, the data set can be data associated with a transaction. The term "data associated with a transaction" or "transaction data" is described herein may generally refer to any appropriate information that is associated with the purchase of a product, goods, and/or service. The purchase may be made at a point of sale (POS) terminal at any physical retail store, mobile, online or virtual store. For example, the purchase may be made using an electronic payment service on a smart phone that includes applications representative of a POS terminal. Without being exhaustive, the data associated with a transaction can include, inter alia, a sales receipt information, product code, brand code, product manufacturer code, information of a retail store, wholesale store, or online store associated with the purchase, a geographical location information, a product department information, information about quantity of product purchased, information of the specific counter in a retail store at which the product was purchased, purchase customer information i.e., if the customer is a member of a loyalty program, and/or a combination of all.

The term 'near real-time transaction data' as used herein may generally refer to transaction data that is transmitted from a data source to a data recipient in near real-time i.e., as and when the transaction data is generated excluding the processing delay of the data source and any network transmission delays.

The term "batch data" as used herein can generally refer to any appropriate data that is collected over a period of time. Further, the data collected over a period of time may be periodically transmitted from a data source to the data recipient in the form of batches. The period of time may be a business day, a day, a week, an hour, thirty minutes, a month, a year, etc. In one embodiment, batch data as used herein may refer to same near real-time transaction data described above, but collected over a period of time instead of sending it as and when the transaction data is generated. The transaction data may be transmitted from a data source to a data recipient in two ways, one being in near real-time i.e., as and when the transaction data is generated, and the other being transaction data collected over a period of time as batch data and transmitted periodically. For example, transaction data X is generated at time t=1, transaction data Y is generated at time t=2, and transaction data Z is generated at time t=3. In the said example, the data source may transmit the transaction data in near real-time, i.e., transaction data X may be transmitted to the data recipient at approximately time t=1, transaction data Y may be transmitted to the data recipient at approximately time t=2, and transaction data Z may be transmitted to the data recipient at approximately time t=3. In addition to transmitting the transaction data X,Y, and Z as and when they are generated, in the said example, the data source may collect the transaction data over a time period t=5, and transaction data X, Y, and Z may be transmitted together as a batch data at time period t=5. The batch data may aid the processing server to validate the transaction data transmitted in near real-time.

The term "data report" as used herein can generally refer to any appropriate processed, visually presentable, and/or a user understandable format of the aggregate data, the transaction data, and/or the combination of both. In one embodiment, the data report can be a statistical or analytical information than can be inferred from the aggregate data, the transaction data, and/or the combination of both. In another embodiment, the data report could be any trends or patterns that can be drawn from the aggregate data. In some embodiments, the data report can include reproduction of unintelligent and/or unprocessed data in a visually presentable format. For example, FTP downloads of a list of data stored in a database which have not been analytically or statistically processed. In an example embodiment, the data report can be represented in the form of tables, graphs, charts, etc. Further, in another example embodiment, the aggregate data as described above may be directly used as data points for each entry of the table, or the graphs. In yet another example embodiment, an aggregate data may be further processed to form data points for the data reports.

Figure 2:
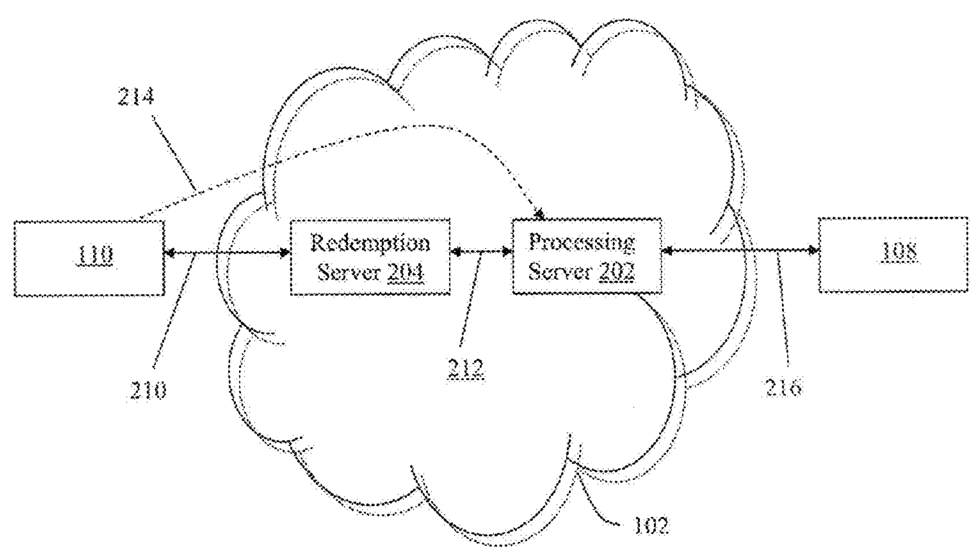
FIG. 2 illustrates an exploded view of processing cloud of the real-time transaction data processing and reporting system, according to certain exemplary embodiments of the present invention.
Figure 3:
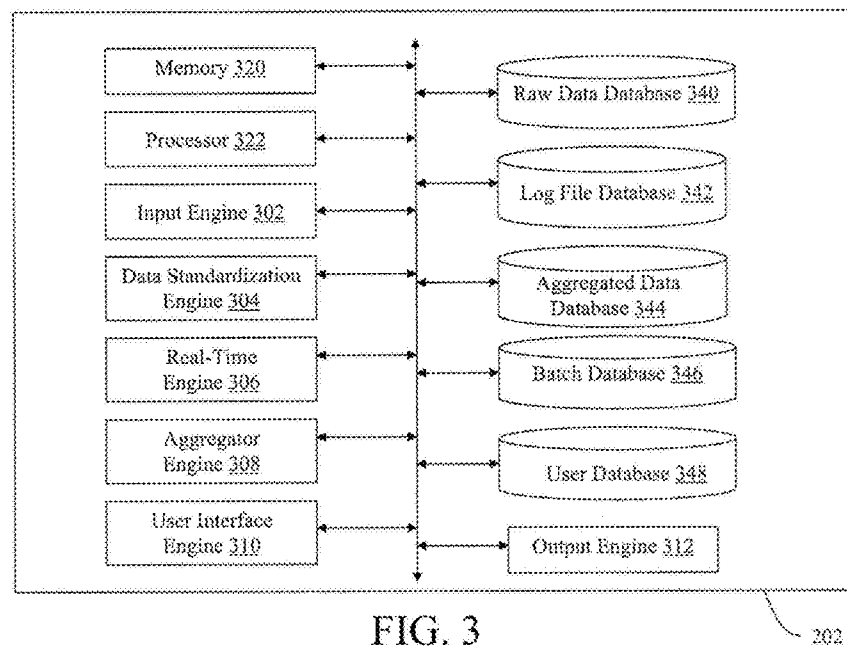
FIG. 3 illustrates a block diagram of the processing server of the processing cloud, according to certain exemplary embodiments of the present invention.

Technology for real-time transaction data processing and reporting platform will now be described in greater detail with reference to FIGS. 1-11, which describe representative embodiments of the present invention. FIGS. 1, 2, and 3 describe the real-time transaction data processing and reporting system, as an exemplary embodiment of an operational environment of processing and reporting transaction data in near real-time. FIGS. 4-8 describe the different operations of real-time transaction data processing and reporting platform using suitable illustrations and flowcharts. Further, FIGS. 9-11 describe the real-time transaction data processing and reporting platform using exemplary user interface snapshots.

The present invention can be embodied in many different forms and should not be construed as limited to the embodiments set forth herein; rather, these embodiments are provided so that this disclosure will be thorough and complete, and will fully convey the scope of the invention to those having ordinary skill in the art. Furthermore, all "examples" or "exemplary embodiments" given herein are intended to be non-limiting and among others supported by representations of the present invention.

A real-time transaction data processing and reporting platform can include a processing server. The processing server may be coupled to one or more data sources over a wired or wireless communication link and configured to receive data in near real-time from each of the data sources. In one embodiment, the data sources may be POS terminals and the data received may be transaction data. Further, the transaction data received from each of the POS terminals may be in a format that is compatible with the operations of the respective POS terminal. In other words, the format of the transaction data received from each POS terminal may be POS specific. In one embodiment, some of the POS specific data formats may be compatible with the operations of the processing server, while other POS specific data formats may be incompatible. In another embodiment, all the POS specific data formats may be incompatible with the operations of the processing server. In yet other embodiments, all the POS specific formats may be fully or partially compatible with the operations of the processing server.

In either case, upon receiving the POS specific data from each POS terminal, the processing server may convert the data from each POS terminal, from a POS specific format to a common format. In one embodiment, the common format may be a POS terminal agnostic and a processing server specific format that is compatible with the processing and reporting operations of the processing server. Responsive to converting the data from each POS terminal into a common format, the processing server may process the data having a common format to generate a number of aggregate data. Further, each aggregate data may be stored in one or more databases associated with the processing server. In an example embodiment, the aggregate data that is to be generated may be pre-defined. In addition to the aggregate data, the POS specific transaction data and the transaction data in the common format (translated data) may be stored in the one or more databases for future processing.

In addition to receiving the transaction data in near real-time, the processing server may be configured to receive batch data. As described above, the batch data may include the transaction data that has been transmitted to the processing server in near real-time, but collected over a period of time. The received batch data may be in a POS specific format. Therefore, upon receiving the batch data, the processing server may convert the batch data to the common format. In some embodiments, the conversion process for the batch data may be more stringent and thorough than the conversion process of the transaction data received in near real-time. In an example embodiment, the conversion process for the transaction data received in near real-time may be made lighter than the conversion process of the batch data to reduce delays and so that the data received in near real-time may be processed and corresponding reports may be generated for an end user in near real-time.

Responsive to converting the batch data, aggregate data similar to the aggregate data calculated based on the near real-time transaction data may be calculated using the batch data. For example, if aggregate data X is calculated using the near real-time data, then the same aggregate data X may be calculated using corresponding batch data. Further, the processing server may compare the aggregate data calculated based on the near real-time transaction data with the aggregate data calculated based on the corresponding batch data received. If the aggregate data do not match, then the processing server may be configured to update the aggregate data calculated based on the near real-time data and stored in the one or more databases with the aggregate data that is calculated based on the batch data. Further, the processing server may be configured to any appropriate data reports that depend on the updated aggregate data stored.

In one embodiment, the processing server may have a client application that may be configured to provide an interactive user interface to an end user. The end user may access data stored in the database associated with the processing server using the interactive user interface. In one embodiment, the interactive user interface may include a number of selectable data reports. In another embodiment, the user can register to periodically receive one or more data reports. When the user selects one or more data report of choice, the client application may forward a request to the processing server.

Upon receiving the request from the client application, the processing server may extract the appropriate aggregate data and/or raw data from the database associated with the processing server and process the extracted data to generate the requested data report. Further, the processing server may be configured to filter and format the data report for presentation to the end user via the web interface. In some embodiments, the data reports may be presented to the end user through any appropriate visual, auditory, tactile, or olfactory means.

Moving now to discuss the figures further, an exemplary embodiment of the present invention will be described in detail. First, FIG. 1 will be discussed in the context of describing a representative operating environment associated with real-time transaction data processing and reporting platform according to certain exemplary embodiments of the present invention. FIGS. 2-3 will be discussed, making exemplary reference back to FIG. 1 as may be appropriate or helpful. Further, the remaining FIGS. 4-11 will be discussed, making exemplary reference back to FIGS. 1-3 as may be appropriate or helpful.

As further discussed below and in accordance with certain embodiments of the present invention, FIG. 1 illustrates an exemplary system that is useful for real-time transaction data processing and reporting; while FIG. 2 illustrates exemplary system elements such as a processing server and FIG. 3 illustrates exemplary elements of the processing server.

Referring now to FIG. 1, this figure illustrates an exemplary operating environment of a real-time transaction data processing and reporting system, according to certain exemplary embodiments of the present invention. In particular, FIG. 1 illustrates end users 108*a-n*, a processing virtual private network 102, and a POS device 110.

As illustrated in FIG. 1, a real-time transaction data processing and reporting system 100 may include end user 108*a-n* that subscribe to services provided by the real-time transaction data processing and reporting system. The end users 108*a-n* may include, inter alia, a manufacturer entity 108*a*, a retailer entity 108*b*, and/or an individual user 108*n*. Using a computing device, the end users 108*a-n* may access the processing cloud/virtual private network 102 and all its associated applications/services via an interactive web interface. The computing devices associated with the end users 108*a-n* may be coupled to the processing cloud/virtual private network 102 via a communication link which may be either wired or wireless. In one embodiment, the computing device may be mobile computing device such as a mobile phone, a smart phone, a tablet, a laptop, etc., that has web interface capabilities. In another embodiment, the computing device may be a stationary computing device such as a desktop, mainframe computer, etc.

In an example embodiment, the interactive web interface may provide the end user with one or more selectable data report options. Using the selectable data report options, the end users 108*a-n* may request for a one or more data reports associated with data from one or more data sources. In an example embodiment, the requested data report may be, inter alia, a graphical report, a statistical report, alerts, analytical report, sales report, marketing report, inventory report, advertisement report, etc. For example in a product sales environment, the manufacturer entity 108*a* may request to track a minute by minute sales of one or more of the manufacturers products across all of United States or Europe. In another example, in a retail store environment, the retailer entity 108*b* may request to receive data reports on sales in each department for specific products such as produce, meat, etc. In an example embodiment, the data source as described herein may be a POS device 110 as illustrated in FIG. 1. One of ordinary skill in the art can understand and appreciate that even though one POS device 110 is illustrated in FIG. 1, the system 100 may include a number of POS devices that are either of the same kind (i.e., make, model, and/or operating process) and/or different kind, without departing from a broader spirit of the disclosure.

The POS device 110 as illustrated in FIG. 1, may include a cash register handled by an attendant or a self-checkout register. Further, the POS device 110 may include any electronic payment terminal such as mobile computing device (e.g., a smart phone or a tablet). The POS device 110 can be configured to scan products and read product codes. For example, the POS device 110 can read a UPC product bar code and/or a QR code. In some embodiments, the POS device 110 can be configured to scan and read other identifiers (e.g., codes) representative of the product. Once the products are scanned and read, the POS device 110 can be configured to generate a transaction data. Further, the POS device 110 can be configured to receive a payment associated with the product purchase as listed in the transaction data. The payment may be received as cash, coins, and/or electronic payment (e.g., mobile wallet, credit card, debit card, loyalty card, etc.)

In one embodiment, the POS device 110 can be configured to generate the transaction data per scan. i.e., a transaction data may be generated after each product or coupon is scanned or read. In another embodiment, the transaction data can be generated after all the products to be purchased are scanned and before calculating a total amount In yet another embodiment, the transaction data can be generated or after the total amount has been calculated. In either case, as and when the transaction data is generated i.e., in near real-time, the POS device 110 may be configured to transmit the transaction data to the processing cloud/virtual private network 102. The transaction data may be transmitted to the processing cloud/virtual private network 102 via one or more communication channels. In some embodiments, the communication channels may be dedicated wired or wireless links adapted to carry large volumes of data with minimal delay. In addition to transmitting the transaction data to the processing cloud/virtual private network 102 in near real-time, the POS device 110 may also be configured to collect and store the transaction data over a period of time. Further, the transaction data that has been collected and stored over a period of time may be transmitted to the processing cloud/virtual private network 102 as batch data. In addition to transmitting data, the POS device 110 may be configured to receive information from the processing cloud/virtual private network 102. Further, the POS device 110 may have network communication capabilities to communicate with the processing cloud/virtual private network 102 and peer-peer communication capabilities to communicate with other POS devices.

In one embodiment, the POS device 110 may include a light weight software message broker (hereinafter 'message broker,' not shown in Figure). The message broker may be configured to communicate messages between the POS device 110 and the processing cloud/virtual private network 102 over the network, as described above. The message broker may be implemented within a base code of POS software which runs on the POS device 110. In one embodiment, the message broker may be provided access to information associated with operations and data formats specific to the POS device 110. The information may aid the message broker to understand the POS specific format and transmit the information to the processing cloud/virtual private network 102. The message broker may be configured to collect product information as they are scanned at the POS device 110 and transmit the collected information to the processing cloud/virtual private network 102 in near real-time. Further, the message broker may be configured to generate a transaction data based on product purchase. In one embodiment, the message broker may be configured to generate transaction data that is in a POS specific format. In other embodiments, the message broker POS device 110 may be configured to generate transaction data that is in a format compatible with the processing cloud/virtual private network 102. In one embodiment, the message broker may be configured to transmit transaction data to the processing cloud/virtual private network 102 in near real-time. In addition to transmitting transaction data in near real-time, the message broker may be configured to collect the transaction data over a period of time for later transmission to the processing cloud/virtual private network 102 in the form of batch data. For more information on the message broker, see, for example, "Message Broker for Redemption of Digital Incentives," as disclosed in U.S. patent application Ser. No. 12/783,762, filed May 20, 2010, now published as U.S. Publication Number 2010/0299198, the entire contents of which are hereby incorporated herein by reference.

As described above after generating the transaction data, the POS device 110 may be configured to transmit the transaction data to the processing cloud/virtual private network 102. which may be described below in greater detail in association with FIG. 2.

Turning to FIG. 2. FIG. 2 illustrates an exploded view of processing cloud of the real-time transaction data processing and reporting system, according to certain exemplary embodiments of the present invention. In particular, FIG. 2 illustrates the end user 108, the POS device 110, the processing cloud/virtual private network 102, the redemption server 204, the processing server 202, first communication link 210, second communication link 212, third communication link 216, and forth communication link 214.

As illustrated in FIG. 2, the processing cloud/virtual private network 102 can include a redemption server 204 and/or a processing server 202. In one embodiment, the redemption server 204 may be configured to receive the near real-time transaction data from the POS device 110, i.e., the transaction data as and when it is generated at the POS device 110, over the first communication link 210. Upon receiving the transaction data, the redemption server 204 may be configured to analyze the transaction data for any product purchase that is eligible for a rebate or an incentive. The incentive may include, inter alia, a discount, an additional free product, a coupon, a gift certificate, loyalty rewards, etc. If the redemption server 204 identifies any product listed in the transaction data is eligible for an incentive, the incentive information may be transmitted to the POS device 110. Further, using the incentive information, the POS device 110 may be configured to provide directly (e.g., discounted bill) or alert a cashier/attendant to provide the incentive.

In addition to analyzing the transaction data for incentive provisions, the redemption server 204 may be configured to translate the transaction data that is in the POS specific format to a common format that is compatible with the operations of the processing server 202. After translation, the redemption server 204 may be configured to transmit the transaction data in the common format (hereinafter 'translated data') to the processing server 202 over the second communication link 212. In some embodiments, the redemption server 204 may be configured to send the incentive information along with the translated data to the processing server 202.

In another embodiment, the transaction data from the POS device 110 may be directly transmitted to the processing server 202 over the fourth communication link 214. In yet another embodiment, the transaction data from the POS device 110 may be nearly simultaneously transmitted to both the processing server 202 and the redemption server 204. As described above, in one embodiment, the transaction data transmitted directly to the processing server 202 may be in a POS specific format. In addition to the near real-time transaction data, the processing server 202 may be configured to periodically receive batch data from the POS device 110 over the fourth communication link 214.

Upon receiving the near real-time transaction data, the processing server 202 may be configured to unpack the data. Further, the processing server 202 may be configured to determine if the received data is in POS specific format. If the received transaction data is in POS specific format, the processing server 202 may be configured to translate the received transaction data to a common format that is compatible with the operations of and services provided by the processing server 202. However, if the received data has already been translated, then the processing server 202 may be configured to sort the translated data into different categories based on a portion of the translated data. The sorted data may be entered into different tables in a database associated with the processing server 202. For example, the translated data may be categorized based on item information, price information, sales information, etc. One or ordinary skill in the art can understand that even though a few examples of categorization are mentioned, the transaction data can be categorized to any appropriate number of tables based on any portion of the transaction data. In some embodiment, the transaction data may be categorized before the translation, whereas in other embodiments as described above, the transaction data may be categorized and indexed after the translation.

In an example embodiment, the received data may be categorized or mapped based on one or more criterion. To mention a few example criterion without being exhaustive, the received data may be categorized based on a retailer-specific criterion and/or a industry standard criterion. The retailer specific criterion or categorization may aid in generating data reports that are customized and cater to the requirements of the retailer. Using the retailer-specific criterion may result in categorizing the received data into departments, number of product baskets scanned, sales of products that have been placed at specific strategic locations within the store, etc. In an industry standard criterion, the received data may be separated into categories that may be recognized across various actors operating in the industry. Categorization of the received data into industry standard categories that are standard to an industry may enable generation of the information (e.g., data report) for a brand user that would be interested in the performance of brand sales across multiple retailers. In an example embodiment, using the industrial standard criterion may result in separating the received data into product categories which may be similar or different from departments within a retail store. For example, a granola bar may be categorized under industry standards as a health food product, whereas the retailer may categorize it based on department as breakfast food product. Based on the industry standard categorization, a manufacturer may be able to view the sales of health food products over multiple stores within a geographic location, whereas retail specific categorization may enable a specific retailer to analyze the breakfast product sales within the specific store. In other words, one of ordinary skill in the art can understand and appreciate that the received data can be categorized into numerous categories based on a data report that needs to be generated and/or based on a type of end user and the requirements of the end user.

Further, the processing server 202 may be configured to generate aggregate data from the data stored in different tables of the database associated with the processing server 202. The generated aggregate data may be stored in the database as well. Further, as and when there are new entries into the database, the new entries may be sent to a processing queue, whereby the processing server 202 may be configured to address each new entry to update the aggregate data to include the new entries in near real-time. The term 'new entry' and/or 'new data' as described herein may refer to new transaction data that is received in near-real time. For example, if transaction data 1 is received at time t=1, then any transaction data received after time t=1 may be considered as new data, i.e., transaction data 2 received at time t=2 may be considered as new data or new entry.

In addition, the processing server 202 may be configured to retrieve the aggregate data and process the aggregate data to generate data reports. The data reports are later adapted for presentation to an end user 108. In some embodiments in addition to sending data reports, the processing server 202 may be configured to receive information from the end users 108. As described above, the end users 108*a-n* may access the processing server 202 via the interactive web interface. Using the web interface, the end users may enter manufacturer or retail information including, inter alia, price updates, new products, new family codes, new product codes, etc as support information that aid in processing the transaction data.

Further, the processing server 202 may be configured to receive batch data in addition to the near real-time transaction data. Using the batch data, the processing server 202 may be configured to validate the received near real-time transaction data and the aggregate data generated based on the near real-time transaction data. The validation operation using the batch data may be described in greater detail below, in association with FIG. 5. Further, the components and operations of the processing server 202 may be described in greater detail below in association with FIG. 3.

Turning to FIG. 3. FIG. 3 illustrates a block diagram of the processing server of the processing cloud, according to certain exemplary embodiments of the present invention. In particular, FIG. 3 illustrates a memory 320, a processor 322, an input engine 302, a data standardization engine 304, real-time engine 306, aggregator engine 308, user interface engine 310, an output engine 312, a transaction data database 340, real-time transcript database 342, an aggregated data database 344, a batch database 346, and a user database 348.

As illustrated in FIG. 3, the processing server 202 can include a processor 322. In one embodiment, the processor 322 can be a multi-core processor. In another embodiment, the processor 322 can be a combination of multiple single core processors. In one embodiment, the processing server 202 can include a memory 320 coupled to the processor 322. The memory 320 can be non-transitory storage medium, in one embodiment. The memory 320 can include instructions. The processor 322 can execute the instructions to perform operations of the processing server 202. In other words, operations associated with the different engines of the processing server 202 can be executed using the processor 322. In an example embodiment, the processing server 202 can include a stand alone data processing device or one or more distributed data processing devices.

In an exemplary embodiment, the processing server 202 can include an input engine 302. In one embodiment, the input engine 302 may be configured to receive POS specific transaction data from the POS device 110. In another embodiment, the input engine 302 may be configured to receive transaction data that has been translated (e.g., translated data) from the redemption server 204. Further, the input engine 302 is configured to receive batch data from the POS device 110. In addition, the input engine 302 may be configured to receive user input, such as a request for a data report associated with the received transaction and/or translated data.

In an example embodiment, upon receiving the transaction data, the input engine 302 may be configured to unpack the received transaction data and analyze the format of the transaction data. In another example embodiment, the input engine 302 may be configured to directly send the any appropriate received data to the data standardization engine 304 without unpacking the data.

In one embodiment, upon determining the format, the input engine 302 may be configured to send the transaction data either to the data standardization engine 304 or the real-time engine 306. For example, if the received transaction data is a translated data, then the input engine 302 may be configured to send the transaction data to the real-time engine 306 for further processing, but if the received transaction data is in a POS specific format, the input engine 302 may be configured to send the transaction data to the data standardization engine 304.

In an example embodiment, the data standardization engine 304 may be configured to receive the transaction data, translate the transaction data from a POS specific format to a common format that is compatible with the operations of the processing server 202. In another example embodiment, the data standardization engine 304 may be configured to receive information from the input engine, extract the received information, transform the received information to a common format, and load (ETL) the transformed transaction data into the one or more databases 340-344. ETL may refer to a process in a database usage that comprises extracting data from a source, transforming the extracted data to fit operational needs of the processing server 202, and loading the translated data to the respective database (340-344) of the server 102.

Upon translation, the translated data can be forwarded to the real-time engine 306. The real-time engine 306 may be configured to receive the translated data which is in common format. Further, the real-time engine 306 may be configured to analyze the translated data to check if additional information is needed for continued processing of the translated data. If needed, the real-time engine 306 may be configured to retrieve additional data from the user database 348 and attach the additional data along with the respective translated data. Further, in some embodiments, the real-time engine 306 may be configured to sort the translated data into different tables representative of different categories. The sorting may be based on a portion of the translated data. In other words, the loading step of the ETL process may be performed by the real-time engine 306.

In addition, the real-time engine 306 may be configured to receive batch data that has been extracted, and translated to a common format. Further, the real-time engine 306 may be configured to process the batch data, append additional information if needed, and categorize the batch data into different tables in the batch database 346.

After categorizing the translated data, the aggregator engine 308 may be configured to process the data in each table to generate aggregate data. Further, the aggregate data may be stored in the aggregate data database 344. Further, the aggregator engine 308, may be configured to periodically check the batch database 346 and generate aggregate data using the batch data.

In an example embodiment, either the aggregator engine 308 or the real-time engine 306 may be configured to validate the aggregate data generated based on the near real-time transaction data by comparing the aggregate data generated based on the near-real time transaction data with the aggregate data generated based on the batch data. For example, the total sales in a day of product X generated based on near real-time transaction data may be compared with total sales in a day of product X generated based on batch data received at the end of the day. If the aggregate data are found to be dissimilar, the real-time engine 306 may be configured to update the aggregate data calculated based on near real-time transaction data with the aggregate data calculated based on the batch data. Further, the real-time engine 306 may be configured to update any other calculation or data reports that may be affected by updating the aggregate data.

Further, the processing engine 202 may include a user interface engine 310. The user interface engine 310 may be configured to provide a web interface through which an end user 108 may access the processing engine 202. In one embodiment, the user interface engine 310 may provide an application programming interface (API) for the end user to access data stored within the different databases 340-348 of the processing server 202. Further, the user interface engine 310 may be configured to authenticate the end user 108 before providing access to the processing server 202 and any associated data. As described above, the users authenticated to access the processing server 202 may include, inter alia, manufacturers, retailers, and other appropriate users.

The end users 108*a-n* can interact with the processing server 202 using the web interface. The processing server 202 can be configured to display data reports and/or information available in the different databases 340-348 through the web interface. In one embodiment, the users can browse the list of tables in each database 340-348, the data entries in each table, data entries in POS specific format, data entries in common format, and/or aggregate data. In another embodiment, each end users 108*a-n* access may be limited for maintaining data privacy. For example, manufacturer X may not be provided access to manufacturer Y's data and so on. In yet another embodiment, the access of the processing server 202 by each end user 108*a-n* may be limited to viewing data reports and direct access of the database entries may be restricted.

In addition to access to the processing server 202, the user interface engine 310 may provide selectable options for a number of data reports associated with the transaction data. For example, the selectable data reports may include, inter alia, a live report of sales of product X per minute, sales performance of all products under brand X, sales performance of product Y in a specific geographical area, per day sales performance of departments within a retail store, etc. Upon receiving a selection for a specific data report, the user interface engine 310 may access the aggregate database 344, retrieve one or more aggregate data that is associated to the generation of the data report, process the one or more aggregate data, and format the processed aggregate data into a data report for presentation to the end user. Further, the data report may be forwarded to the output engine 312 that may be configured to output the data report to any appropriate computing or presentation device of the end user 108*a-n*. The operations of the processing server associated with real-time transaction data processing and reporting may be described in further detail below in association with FIGS. 4-8.

Although specific operations are disclosed in the flowcharts illustrated in FIGS. 4-8, such operations are exemplary. That is, embodiments of the present invention are well suited to performing various other operations or variations of the operations recited in the flowcharts. It is appreciated that the operations in the flowcharts illustrated in FIGS. 4-8 may be performed in an order different than presented, and that not all of the operations in the flowcharts may be performed.

All, or a portion of, the embodiments described by the flowcharts illustrated in FIGS. 4-8 can be implemented using computer-readable and computer-executable instructions which reside, for example, in computer-usable media of a computer system or like device. As described above, certain processes and operations of the present invention are realized, in one embodiment, as a series of instructions (e.g., software programs) that reside within computer readable memory of a computer system and are executed by the processor of the computer system. When executed, the instructions cause the computer system to implement the functionality of the present invention as described below.

Figure 4A:
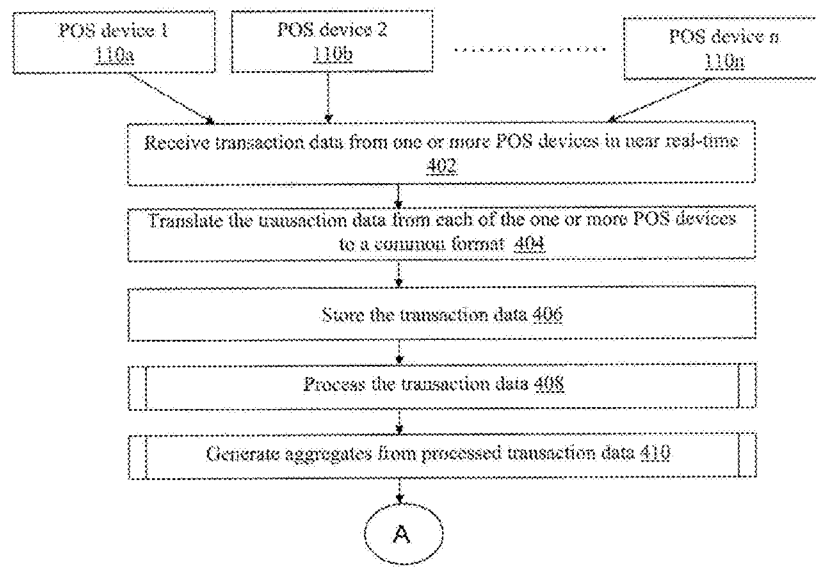
FIGS. 4A and 4B (collectively 'FIG. 4') are flow charts that illustrate a end to end data flow with respect to the processing engine of the real-time transaction data processing and reporting system, according to certain exemplary embodiments of the present invention.
Figure 4B:
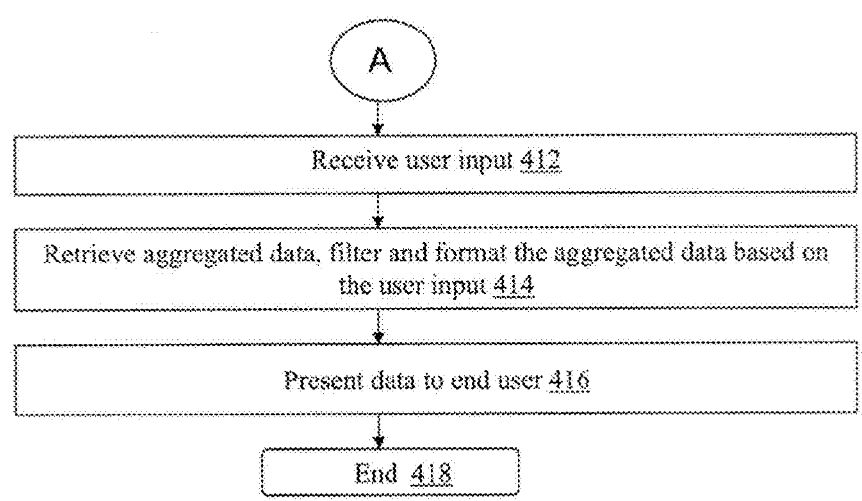

Turning to FIGS. 4A and 4B (collectively FIG. 4). FIGS. 4A and 4B (collectively 'FIG. 4') are flow charts that illustrate a end to end data flow with respect to the processing engine of the real-time transaction data processing and reporting system, according to certain exemplary embodiments of the present invention. In operation 402, the input module 302 of the processing server 202 may receive transaction data directly from one or more POS devices 110*a-n* in near real-time i.e., as and when the transaction data is generated at each POS devices 110*a-n*. The transaction data received from the one or more POS devices 110*a-n* may be in a format that is specific to the POS device and the transaction data generated by different POS devices 110*a-n* may have different formats.

In another embodiment, in operation 402, the transaction data from the one or more POS devices 110*a-n* may be received by a redemption server 204 as described above. Further, the redemption server may extract, and translate the transaction data to generate a translated data, which is then forwarded to the processing server 202. In the embodiment that the redemption server 204 receives the transaction data, the input module 302 of the processing server may receive a translated data from the redemption server 204. In some embodiments, the data received from the redemption server 204 may be partially translated. In yet another embodiment, the redemption server 204 may be configured to translate the received transaction data from a POS specific format to a different format, which may then be forwarded to the processing engine 202 for further translation to the common format (e.g., translated data).

In addition to the transaction data that is received in near real-time, the input engine 302 may also be configured to receive the same transaction data that has been collected at the one or more POS devices 110*a-n* over a period of time as batch data. Operations of the processing server 202 associated with the batch data may be described in greater detail below in association with FIG. 5.

Further in operation 402, upon receiving either the translated data from the redemption server or the transaction data directly from the one or more POS devices 110*a-n*, the input engine 302 may send the received data to either the data standardization engine 304 or the real-time engine 306. If the received data has already been translated to a common format that is compatible with the operations of the processing server 202, then the input engine 302 may forward the translated data to the real-time engine 306 for the further processing. However, if the received data is in POS specific format, the input engine 302 may send the received data (e.g., transaction data) to the data standardization engine 304.

In addition, in operation 402, the input engine 302 may be configured to store the received POS specific transaction data or the received translated data in the transaction data database 340. Further, the input engine 302 may record each event associated with the processing engine and/or the transaction data processing in a real-time transcript database 342 to provide audit trail for system diagnostics or reconstruction of any appropriate event in the future. The audit trail may include, but is not limited to, the different events, the time at which the events took place, the sequence in which the events took place, the format of the data that is received (POS specific or translated), the source of the received data (POS devices 110*a-n*), etc.

If the received data at the input engine 302 is a transaction data that is in a POS specific format, as described above the transaction data may be forwarded to the data standardization engine 304. In an exemplary embodiments, after the transaction data has been sent to data standardization engine 304, in operation 404, the data standardization engine 304 may determine the POS device 110 from which the transaction data is received and the type of the POS device, i.e., the make, model, and/or data formats of the POS device 110 associated with the transaction data. The processing server 202 may include different set of instructions for translation of transaction data from different POS devices 110*a-n*. Responsive to determining the POS device and the type of POS device, the data standardization engine 302 may translate the transaction data from one or more POS devices 110*a-n* having one or more POS specific formats to transaction data having a common format (e.g., translated data) based on the type of the POS device associated with each transaction data. Responsive to translation, in operation 406, the data standardization engine 304 may store the translated data that is in the common format to the transaction data database 340. In some embodiments, the data standardization engine 304 may be configured to store the translated data in a different database, such as a common format database (not shown in Figures). In addition to storing the translated transaction data, in operation 406, the data standardization engine 304 may transmit the translated data to the real-time engine 306.

Upon receiving the translated data, in operation 408, the real-time engine 306 may process the translated data. The step of processing the translated data may be described in further detail below in association with FIG. 6.

Figure 6:
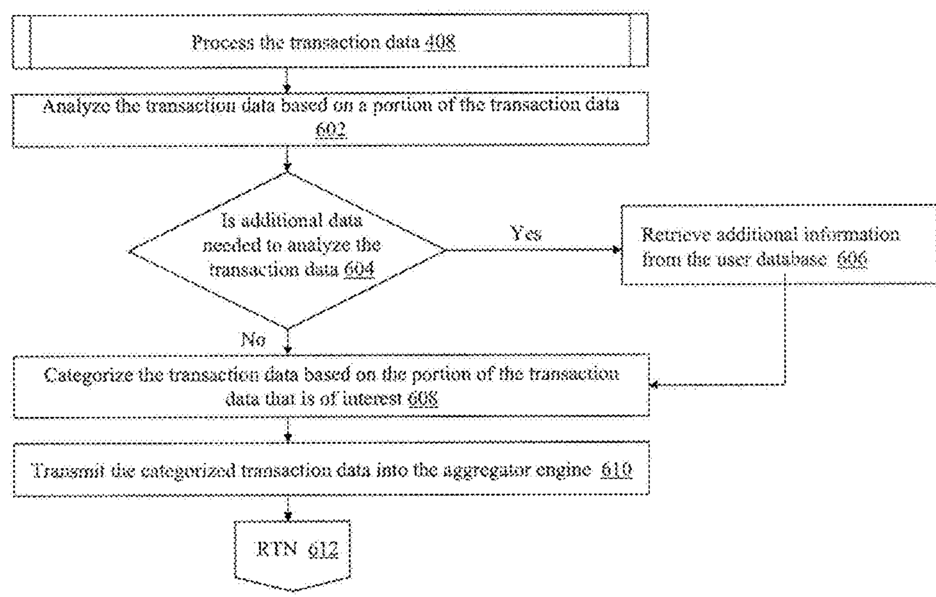
FIG. 6 is a flow chart that illustrates a process of processing the real-time transaction data, according to certain exemplary embodiments of the present invention.

Turning to FIG. 6. FIG. 6 is a flow chart that illustrates a process of processing the real-time transaction data, according to certain exemplary embodiments of the present invention. In operations 602 and 604, the real-time engine 306 may receive the translated data and analyze the data entries in the translated data to check if additional information has to be retrieved for supporting processing of the translated data. For example, if the transaction data lists a product name X, the quantity purchased, and the price associated with the product X, the real-time engine 306 may determine if additional details associated with the product X has to be retrieved for any calculations associated with the transaction data. In one embodiment, the real-time engine 306 may determine if additional information has to be retrieved and if so, what that additional information is, based on the aggregate data that is to be calculated by the aggregator engine 308.

If additional information is needed, in operation 606 the real-time engine 306 may retrieve additional product information or any appropriate supporting information from the user database 348. The user database 348 may include additional product information or other supporting information that are periodically received or updated by the end users 108*a-n* such as the manufactures, retailers, etc. For example, the manufacturers may send information regarding price changes or any new product that is launched. In another example, a retailer may provide information of any product that is being taken off from sales at a retail store.

After retrieving additional information, in one embodiment, the real-time engine 306 may append or add the additional information to the translated data. However, if additional information is not needed, the real-time engine 306 may process the translated data without appending any additional information. In either case, in operation 608, the real-time engine 306 may sort the translated data with or without the additional information into different categories based on a portion of the translated data. For example, the translated data may be categorized based on, but not limited to, each transaction, product information, brand information, sales information, store information, geographical location information, time period information, etc. Further, the transaction data that has been categorized may be stored in different tables in any one of the databases 340-346 associated with the processing server 202.

In an alternate embodiment, the transaction data in the POS specific format may be categorized prior to translation of the transaction data and prior to sending the transaction data to the real-time engine 306. In said alternate embodiment, the categorized transactional data that is in POS specific format may be retrieved from each table and translated to a common format by the data standardization engine 306.

Responsive to categorizing the translated data, in operation 610, the real-time engine 306 may send the categorized data from each table to the aggregator engine 308. After sending the categorized data to the aggregator engine 308, in operation 612 the real-time engine 306 may return to operation 410 of the processing server 202 illustrated in FIG. 4.

Turning back to FIG. 4A, in operation 410, the aggregator engine 308 may generate one or more aggregate data. In an example embodiment, the aggregate data to be generated may be pre defined. Operation 410 is described in greater detail below in association with FIG. 7.

Figure 7:
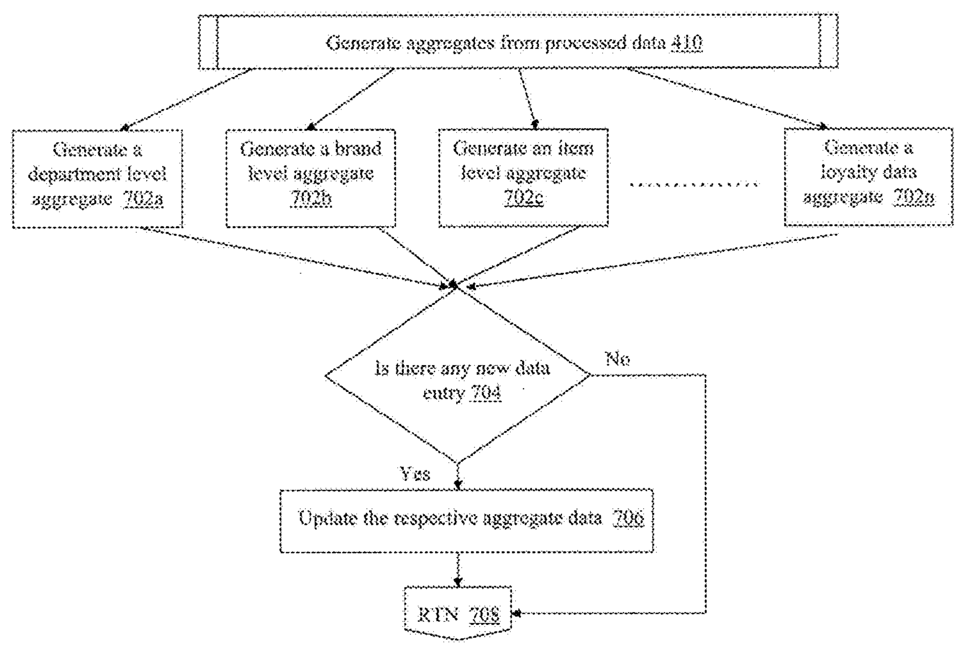
FIG. 7 is a flow chart that illustrates a process of generating aggregates from the processed data, according to certain exemplary embodiments of the present invention.

Turning to FIG. 7. FIG. 7 is a flow chart that illustrates a process of generating aggregates from the processed data, according to certain exemplary embodiments of the present invention. As described above, the aggregator engine 310 may be configured to receive data entries from each table, wherein each table includes transaction data in common format (i.e., translated data) that has been categorized based on a portion of the transaction data in common format. In the example embodiment illustrated in FIG. 7, the transaction data may be categorized based on, but not limited to, a department associated with a product listed in the transaction data, a brand associated with the product listed in the transaction data, each product listed in the transaction data, and loyalty information associated with the product listed in the transaction data. In some embodiments, the different categories into which the transaction data is categorized may depend on the aggregate data that is to be generated.

In the example embodiment of FIG. 7, the aggregator engine 310 may generate one or more aggregate data, each associated with the entries in their respective tables. For example, in operation 702*a*, the aggregator engine 310 may be configured to generate a department level aggregate data that may reflect the total sales in each department of a retail store. Further, in operation 702*b*, the aggregator engine 310 may be configured to generate a brand level aggregate data that may reflect the total sales of all products listed under a brand. Similarly, in operations 702*c* and 702*n*, the aggregator engine 310 may be configured to generate an item level aggregate and a loyalty data aggregate, wherein the item level aggregate may reflect the total sales associated with a product in a store in a given day and the loyalty data aggregate may reflect products that are purchased by members who are registered with a loyalty program using the loyalty rewards. One of ordinary skill in the art can understand and appreciate that even though only few example aggregate data have been described herein, many different types of aggregate data can be generated by the aggregator engine 310. For example, the aggregator engine 310 may be configured to generate aggregate data associated with product sales at different levels such as sales of products classified as dairy products, sales of products under dairy products within all stores in a given geographical location, sales of products under dairy products in each checkout lane, etc. In an example embodiment, aggregate data representative of number of product baskets processed in each checkout lane (or per POS terminal) may be generated to determine efficiency of the store personal manning the POS terminal.

Responsive to generating the aggregate data, in operation 704, the aggregator engine 310 may be configured to check if there are any new entries or new transaction data that has been received at the processing server 202. If there are new entries or new transaction data, in operation 706, the aggregator engine 310 may update the respective aggregate data. For example, if there is a new entry in the table that reflects product sales, the aggregator engine may update the item level aggregate data, i.e., if the aggregate data for sales of product X is 10 and if there is a new entry in the product X sales table, the aggregator engine 310 updates the aggregate data to 11 to reflect the latest update in the table. In other words, the aggregator engine 310 may be configured to update the appropriate aggregate data as and when new transaction data or new data entry in a respective database table is detected. Thereby, the processing server 202 can provide live updates of aggregate data in real-time.

In an additional embodiment, the aggregator engine 310 may be configured to compare latest near real-time data with previously stored aggregate data to generate alerts based on a set of predetermined criterion, for example, drop in sales of a product, detection of new product, etc. The near real-time data may be stored in queue as and when they arrive and they may be compared to an appropriate aggregate data to determine trends and patterns. For example, if product sales of product X has increased by 10% from the previous week, then the aggregator engine may generate an alert message that may be presented to the user.

Further, in operation 706, the aggregator engine 310 may store the generated and/or updated aggregate data in the aggregate data database 344. Responsive to storing the aggregate data, in operation 708, the aggregator engine 310 may return to operation 412 of the processing server as illustrated in FIG. 4B.

Turning now to FIG. 4B, in operation 412, the input engine 302 may receive a user input representative of a request for a data report. An end user 108*a-n* may select a data report from a menu of one or more selectable data reports presented via a web interface. The different selectable data reports may be described in greater detail below in association with FIGS. 9-11. In another embodiment, the end user 108*a-n* may subscribe to receive one or more data reports, and/or alerts during an initial registration process. Based on the subscription, the user interface engine 310 may automatically generate one or more data reports to be presented to the end user.

Responsive to receiving the user input and/or based on an end user 108 subscription, in operation 414, the user interface engine can retrieve one or more aggregate data associated with the requested data report. Further, the user interface engine 310 can format the one or more aggregate data and can generate a data report based on the retrieved one or more aggregate data. In one example, the end user may select a data report that shows the total sales of all product listed under a brand label. Responsive to receiving the request for the said data report, the user interface engine 310 may access the aggregate database 346 and retrieve the brand level aggregate data calculated in operation 702*b* illustrated in FIG. 7. In another example, the end user 108*a* may have subscribed for live reports on comparison of product X sales with product Y sales. Responsive to receiving the request for data comparison report, the user interface engine 310 may be configured to retrieve item level aggregate for product X and item level aggregate for product Y. Further, the user interface engine 310 may be configured to compare both the aggregate data and generate an appropriate report. One of ordinary skill in the art can understand and appreciate that the user interface engine may be configured to perform any analytical or statistical operations of the aggregate data to generate the data reports.

Further, in operation 414, the user interface engine 310 may forward the data report to the output engine 312. In operation 414, the output engine may format the data report for presentation on a computing device or a display device associated with the end user 108. In addition to processing the transaction data received in near real-time and generating aggregate data for data reports, the processing server 202 may be configured to validate the received data, the generated aggregate data and/or the data reports using a batch data. The validation operation of the processing server 202 may be described in greater detail below in association with FIG. 5.

Figure 5:
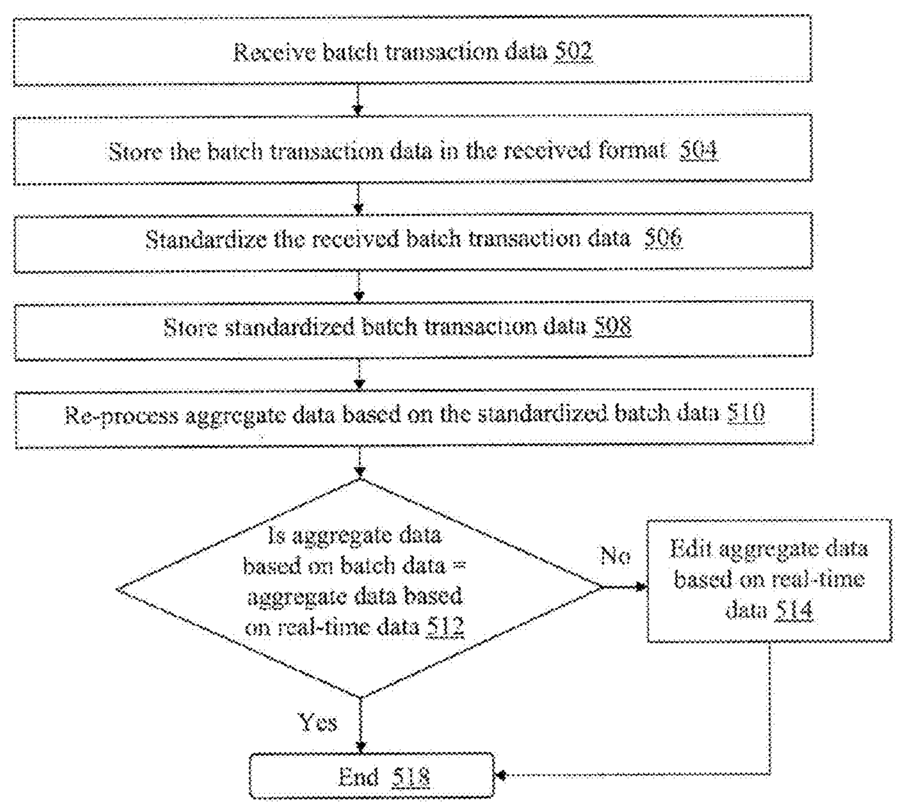
FIG. 5 is a flow chart that illustrates a process of batch transaction data management by the processing server of the real-time transaction platform, according to certain exemplary embodiments of the present invention.

Turning to FIG. 5. FIG. 5 is a flow chart that illustrates a process of batch transaction data management by the processing server of the real-time transaction platform, according to certain exemplary embodiments of the present invention. The validation process begins at operation 502 when the input engine 302 receives the batch data from one or more POS devices 110*a-n*. In an example embodiment, the batch data may be in a POS specific format. Responsive to receiving the batch data which is in the POS specific format, in operation 504, the input engine 302 may store the batch data having the POS specific format within a portion of the batch database 346. Further, similar to the processing of the near real-time transaction data, in operation 506, the input engine 302 and/or the data standardization engine 304 may extract the batch data, transform the batch data to a common format and load the transformed batch data in the batch database 346. In one embodiment, the batch data may be categorized prior to translating the batch data based on a portion of the batch data. In another embodiment, the batch data may be categorized after the batch data has been translated. In either case, the batch data may be categorized into the one or more categories. The categories may be similar to the categories into which the near real-time transaction data is categorized in operation 608 illustrated in FIG. 6. Further, the categorized batch data is stored in tables within the batch database 346.

Responsive to extracting, transforming and loading the batch data into tables, in operation 510, the aggregator engine 308 may be configured to generate aggregate data based on the batch data. The aggregate data generated in operation 510 may be similar to aggregate data generated in operations 702*a*-702*n* illustrated in FIG. 7, but using batch data. Upon generation of the aggregate data, in operation 512, the aggregator engine 308 may compare aggregate data generated based on the near real-time data in operations 702*a*-*n* (shown in FIG. 7) with the corresponding aggregate data generated based on the batch data in operation 510.

If the aggregate data matches, then the validation process ends at operation 518. However, if the aggregate data does not match, then in operation 514, the aggregator engine 310 may edit the aggregate data generated in operations 702*a*-*n* based on near real-data transaction data to replace the said aggregate data with the aggregate data generated based on the batch data. In another embodiment, if the aggregate data do not match in operation 512, the aggregator engine 310 and/or the real-time engine 308 may check each entry of the received batch data in the POS specific format against each corresponding entry of the near real-time transaction data in the POS specific format that is stored in the transaction data database. Further, each entry of the translated batch data may be compared with each corresponding entry of the translated near real-time transaction data. Any non-matching entry may be updated with the corresponding batch data entry. In yet another embodiment, if the aggregate data do not match, the aggregator engine 308 and/or the user interface engine 310 may update any data report that is dependent on the updated aggregate data and/or the updated transaction data in POS format and/or in common format. Responsive to making all the respective updates, the validation process ends at operation 518.

Figure 8:
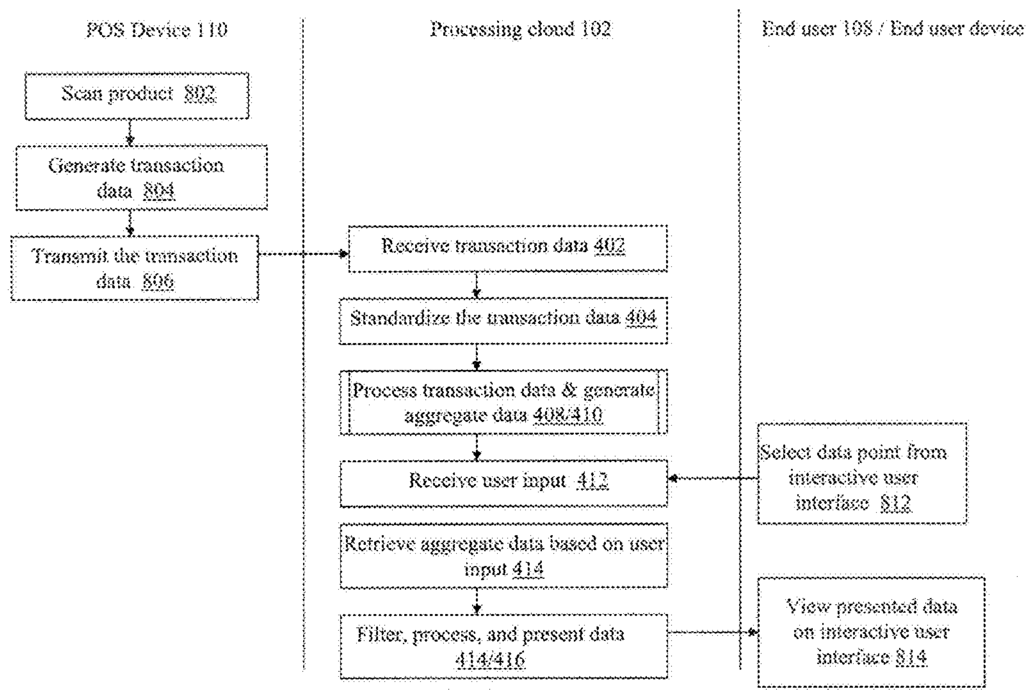
FIG. 8 is a flow chart that illustrates a process of real-time reporting, according to certain exemplary embodiments of the present invention.

Turning to FIG. 8. FIG. 8 is a flow chart that illustrates a process of real-time reporting, according to certain exemplary embodiments of the present invention.

The process begins at the POS device 110 with operation 802. In operation 802, a product may be scanned for purchase at the POS device 110. Further, in one embodiment, in operation 804, when the product is scanned, the POS device 110 may generate a transaction data comprising information about the purchase. In another embodiment, in operation 804, the POS device 110 may wait for all the products in a purchase basket to be scanned before generating the transaction data. In either case, in operation 806, as and when the transaction data is generated, in operation 806, the POS device 110 may transmit the transaction data to the processing cloud/virtual private network 102. In addition, in operation 806, the POS device 110 may store all transaction data generated over a period of time to be transmitted at a later time in the form of batch data.

Responsive to transmitting the transaction data, in operation 402 either the redemption server 204 or the input engine 302 of the processing server 202 may receive the transaction data. As described in FIGS. 4-7, in operations 404-410 the received transaction data may be converted to a common format followed by indexing the converted transaction data (or translated data) into different categories represented by tables in a database. In some embodiments, the transaction data may be indexed before the conversion. Further, the indexed data may be retrieved the from the different tables and aggregate data may be generated based on the indexed data. Further, the aggregate data may be stored in an aggregate database 346.

In operation 812, using a computing device, an end user 108 may select a data report option from a selectable menu that lists different data reports. The selectable menu may be presented to the end user via an interactive web interface which is described in greater detail below, in association with FIG. 9.

Figure 9:
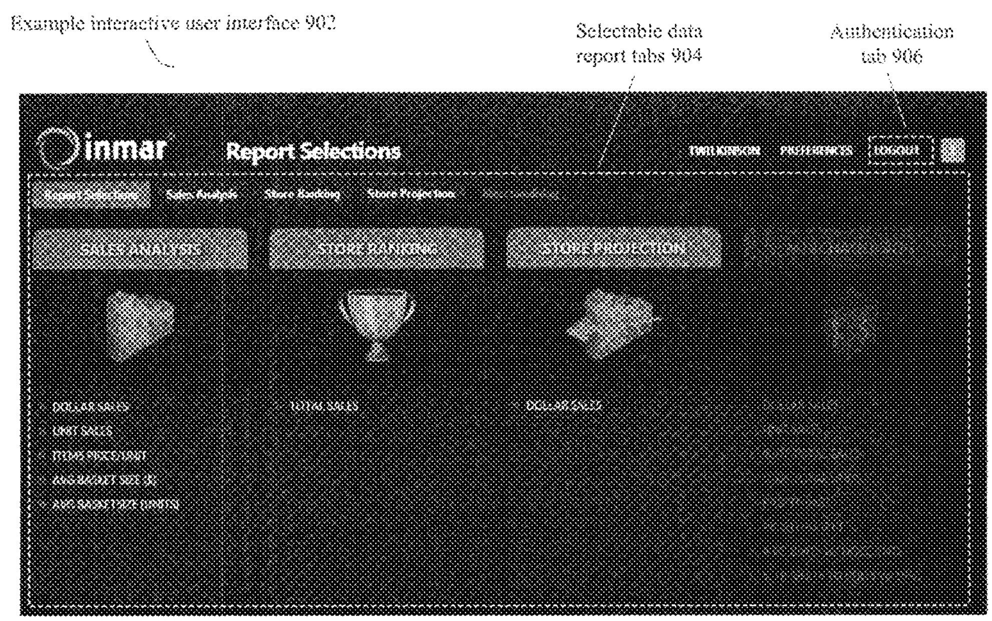
FIG. 9 illustrates an example interactive user interface associated with the real-time transaction platform, according to certain exemplary embodiments of the present invention.

Turning to FIG. 9. FIG. 9 illustrates an example interactive user interface associated with the real-time transaction platform, according to certain exemplary embodiments of the present invention. In particular, FIG. 9 illustrates an example authentication tab 906, an example selectable data reports index 904, an example interactive user interface 902.

In one embodiment, FIG. 9 illustrates one example instant of the interactive user interface 902. In other embodiments, the layout and structure of the interactive user interface can be different in terms of where the tabs are located. Further, the tabs, reports, and/or any appropriate messages may be colored or highlighted with colors to which a human eye is more receptive. For example, green for positive alerts, and red for negative alerts. In another embodiment, the arrangement of the index of selectable data reports 904 may be horizontal and/or vertical. One of ordinary skill in the art can understand and appreciate that even though only a few tabs are illustrated and described herein, the interactive user interface 902 can include a number of functionally relevant tabs, without departing from the broader spirit of the disclosure.

In one embodiment, the user interface 902 may include a login tab 906. When the login tab 906 is selected, a new authentication page may open that requests for user authentication information. The user authentication information may include, but not limited to, a username, a password, an auditory and/or biometric scan authentication request. The authentication page may be a secure and encrypted page. In addition to requesting user authentication information, the authentication page may also provide options to create a new account for new users. Responsive to selecting the option to create a new account, a user may be taken to a user information page, where are user may register with the processing server 202. In one embodiment, the user information page may include data entry fields for a user to enter user profile information.

In addition to the login tab, the user interface 902 may include a preference tab 908. When the preference tab 908 is selected, the user may be guided to a preference page that includes options which allow a user to customize or personalize the interactive user interface page 902 specific to the users desire. The customization option may include, but not limited to, arrangement of various elements in the web page such tabs, highlights, colors, reports that need to be shown as soon as the user logs in, most frequently requested data reports, most frequently changing data reports, alert messages, competitor information, social media links and reports, etc. Further, the preference page can include a subscription option that allows a user to subscribe to alerts, data reports that provide live updates or periodic updates. In addition, triggers for reporting the updates can be set during the subscription too. The options can also include features to input a preferred presentation format of the data report and alert. In one embodiment, the alerts may be reported out to the user as a message through auditory, visual, tactile, and or olfactory mediums. The alerts messages may be set to flash, scroll, or fade and the frequency at which the alert message flashes or scrolls can be preset.

Further, the preference page may have options to provide preferences within a data report. For example, data reports may be presented in the form of tables, charts, graphs, etc. The user can select desired settings for the data report format. Example data reports are described in association with FIGS. 10-11.

In another embodiment, the interactive user interface 902 can provide options to download a client application associated with the processing server 202. The client application can include a dashboard feature, wherein the dashboard feature provides alert messages, updates, and time tickers indicating minute by minute updates in the form of a dashboard on a users computing device. The dashboard may be a smaller digital/software window that may be moved around and set at a desired location on the display of the computing device. The window may provide messages as desired and/or preset by the user. In other embodiments, the client application can include pop up features to present the updates and or alerts as pop-ups.

Once the user has registered, customized, and/or subscribed to alerts and data reports, the user may be guided back to a user authentication page where the user may be requested to enter authentication information. Upon being authenticated, the user may be guided to the users personalized user interface page. Based on the user subscription and registration information, certain features may be masked from the user. For example, the user may not be able to access some reports. The masked reports may not be selectable. Further, the personalized user interface may include different filters that a user can apply on the data report. For example, the user may be able to apply a location filter to alter the data report to reflect information specific to a desired geographical location.

If the user has previously subscribed for data reports during the registration process, the customized user interface may provide the requested data reports. In other embodiments, the user may be presented with the index of selectable data reports. In one embodiment, each selectable data report may be hyperlink that when selected sends a request to the processing server 202. Receiving the request at the processing server 202 may trigger operations 412-416 as illustrated in FIG. 8.

Referring back to FIG. 8. In operations 412-416, the input engine 302 of the processing server 202 receives a request for a data report. Further, the request may be forwarded to a user interface engine 310. Upon receiving the request, the user interface engine 310 may be configured to retrieve appropriate aggregate data from the aggregate database 344. Further, the retrieved aggregate data may be processed to generate the data report. The processing may include, but not limited to, an average of one or more aggregate data, a sum of one or more aggregate data, a mean of one or more aggregate data, a percentage value of each of one or more aggregate data, or just a presentation of all aggregate data. In some embodiments, the user interface engine 310 may be configured to pre-fetch or cache one or more aggregate data based on a prediction of data report requests that may be received, or based on the most frequently requested data reports.

Further, once the data reports are generated, the user interface engine 310 may send the data reports to the output engine 312. The output engine may determine the users preferred format. For example, the user may prefer to receive the report as a graph, such as a bar chart, pie chart, etc. In another example, user may prefer the data report in both tabular format and as graphs, wherein the table may be interactive in that the user can click table headings to sort (ascending or descending order) entries within each column or row. Based on the user preference, the output engine 312 may format the data report for presentation and transmit the report back to the computing device associated with the end user 108, wherein the data report may be presented on the web interface in operation 814.

Figure 12:
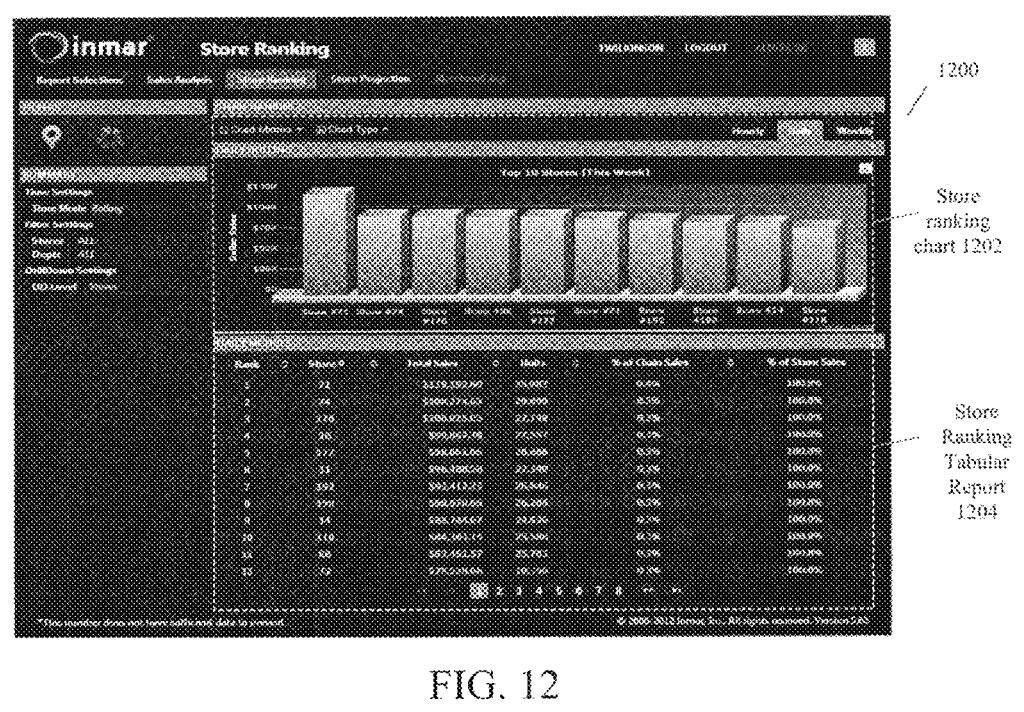

As illustrated in FIG. 9, the example user interface 902 may provide four example data report options for a user to choose from. The example data report options may include sales analysis report, store ranking report, store projection report, and/or merchandising report. One or more options may be masked from the user based on the users access privilege. Further, each option may or may not have additional sub-options as illustrated in FIG. 9. In an example embodiment, when a user selects one of the four options, for example a store ranking option, the user may be guided to a page representative of a store ranking data report as illustrated in FIG. 12. In some embodiments, the user interface may be configured to allow a user to select more than one options, and the more than one corresponding data reports may be displayed side by side in different displays or within the same display.

Turning to FIG. 12. FIG. 12 illustrates an example data report presented in an example user interface, according to certain exemplary embodiments of the present invention. In particular, FIG. 12 illustrates a store ranking data report page 1200. The store ranking data report page 1200 may include a chart 1202 representative of store rankings based on daily dollar sales. The Y axis may represent the sales in dollars at a store and the X axis may represent the store number or name. In addition to the chart, the page 1200 may include a tabular view of the daily sales at each store. In one embodiment, the granularity of the report can be changed to represent minute by minute sales ranking, hourly sales ranking, weekly sales ranking, yearly sales ranking, etc. Further, the store ranking report may be a live/dynamic report in that the ranking values may change minute by minute and the graphs and tables may be updated accordingly to reflect the changing values. Additional exemplary embodiments of the data report may be described in greater detail below in association with FIGS. 10 and 11.

Figure 10:
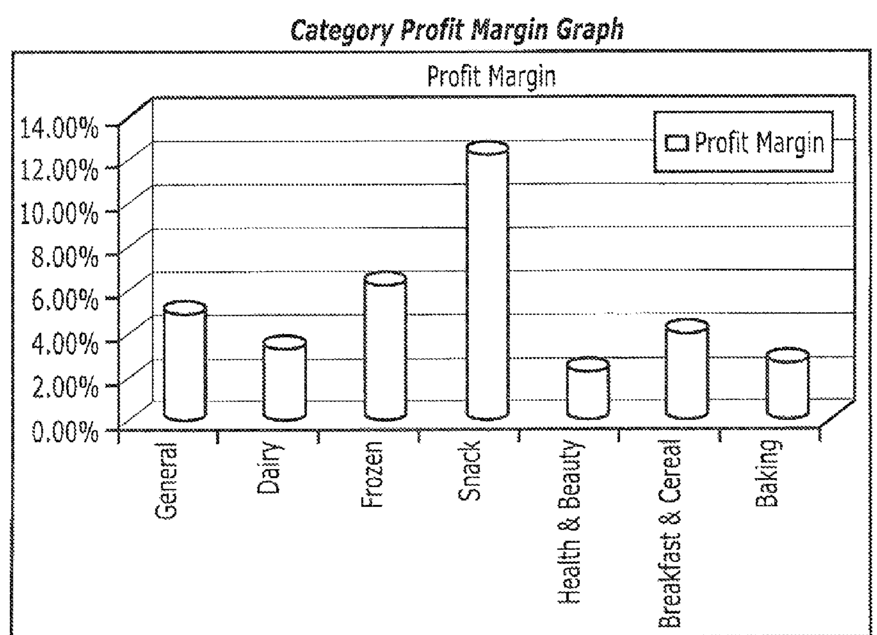
FIGS. 10 and 11 illustrate examples of different real-time reports, according to certain exemplary embodiments of the present invention.
Figure 11:
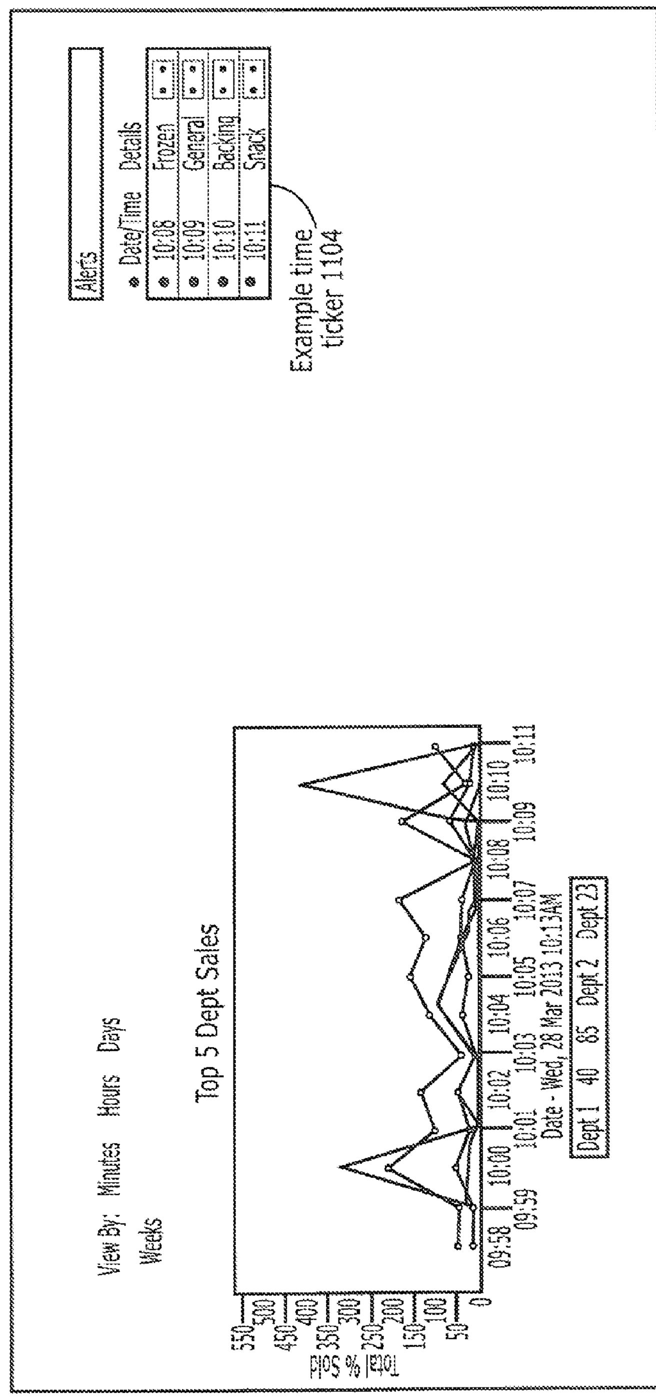

Turning to FIGS. 10 and 11. FIGS. 10 and 11 illustrate examples of different real-time reports, according to certain exemplary embodiments of the present invention. The example graph illustrated in FIG. 10 may be related to an example category performance data report. The example category performance data report may include sub-options for a category unit margin graph and a category profit margin graph. FIG. 10 illustrates a category profit margin graph that is representative of profit made on products within a certain category or department of a retail store in a day or at a given time.

When a user selects the option for a category profit margin graph, the request may be sent to the processing server 202, wherein the processing server 202 may retrieve one or more aggregate data representative of products sold within each departments of a retail store, for example, product sales (in dollars) in dairy category, general category, frozen category, snack category, health and beauty category, breakfast and cereal category, and/or baking category. Further, the processing server 202 may determine the operations to be performed to generate the profit margin. For example, profit margin=unit margin/price per unit, and unit margin=sales price per unit−cost per unit. Accordingly, the processing engine 202 may determine if the price per unit, sales prices per unit and cost per unit is available with the aggregate data. If not, the processing server 202 may retrieve these additional/supporting information from the user database 348. Further, the processing server 202 may calculate the profit margin and forward the profit margin data report to the output engine 312. Responsive to receiving the profit margin data report, the output engine 312 may generate a bar graph based on a user's choice to represent the profit margin in each departments in a given day as illustrated in FIG. 10. The X-plane of the graph in FIG. 10 represents the different departments/product categories and the Y-plane represents profit margin in percentage. Further, each bar represents the profit margin of a given product category. In an example embodiment, each bar in the graph may be clickable, and upon selection, the selected bar chart may be converted to another format such as a tabular or pie chart format.

In another embodiment, the user may request the data report to represented as a line chart instead of a bar chart. Further, the user may desire a chart that illustrates a minute by minute sales report of each product category or retail store department as illustrated in FIG. 11. FIG. 11 depicts the sales (in dollar) report of five departments in a retail store. Each line graph represents a separate department sales. The graph in FIG. 11 plots a dollar value against time in increments of minutes. In addition to the line graph, FIG. 11 illustrates a ticker that trickles in transactions as they come in from the various POS devices in the retail store. Even though a minute by minute functionality is depicted in FIG. 11, one of ordinary skill in the art can understand and appreciate that calculation based on any appropriate time periods may be within the scope of this disclosure.

Although the present embodiments have been described with reference to specific example embodiments, it will be evident that various modifications and changes may be made to these embodiments without departing from the broader spirit and scope of the various embodiments. For example, the various devices and modules described herein may be enabled and operated using hardware circuitry (e.g., CMOS based logic circuitry), firmware, software or any combination of hardware, firmware, and software (e.g., embodied in a machine readable medium). For example, the various electrical structures and methods may be embodied using transistors, logic gates, and electrical circuits (e.g., application specific integrated (ASIC) circuitry and/or in Digital Signal Processor (DSP) circuitry).

The terms "invention," "the invention," "this invention," and "the present invention," as used herein, intend to refer broadly to all disclosed subject matter and teaching, and recitations containing these terms should not be misconstrued as limiting the subject matter taught herein or to limit the meaning or scope of the claims. From the description of the exemplary embodiments, equivalents of the elements shown therein will suggest themselves to those skilled in the art, and ways of constructing other embodiments of the present invention will appear to practitioners of the art. Therefore, the scope of the present invention is to be limited only by the claims that follow.

In addition, it will be appreciated that the various operations, processes, and methods disclosed herein may be embodied in a machine-readable medium and/or a machine accessible medium compatible with a data processing system (e.g., a computer system), and may be performed in any order (e.g., including using means for achieving the various operations). Accordingly, the specification and drawings are to be regarded in an illustrative rather than a restrictive sense.

What is claimed is:

1. A method comprising:

using a processor and a memory coupled thereto to, in real time receive transaction data from a plurality of point-of-sale (POS) terminals over a communications network, the POS terminals each having a POS device type from among a plurality of different POS device types and each being configured to scan a plurality of products and generate the transaction data, the transaction data from each of the plurality of POS terminals being in a different POS device type format, and the transaction data being received after each product of the plurality thereof is scanned on a per-scan basis, determine a given POS device type based upon the transaction data, convert the transaction data from each of the plurality of POS terminals to a common format using a corresponding set of translation instructions stored in the memory for the given POS device type, and aggregate the converted transaction data in the common format;

using the processor and memory to receive a request, via the communications network from an end user, for a data report associated with the aggregated converted transaction data, based upon the request, generate a transaction data report from the aggregated converted transaction data, and transmit the transaction data report to the at least one end user via the communications network.

2. The method of claim 1, further comprising:

using the processor and the memory coupled thereto to receive a batch of transaction data from a given one of the plurality of POS terminals, determine the given POS device type for the given one of the plurality of POS terminals based upon the batch of transaction data, convert the batch of transaction data into the common format, aggregate the converted batch of transaction data in the common format, compare the aggregated converted batch of transaction data with the aggregated converted transaction data to determine a match, and when there is no match, aggregate the aggregated converted batch of transaction data with the aggregated converted transaction data.

3. The method of claim 2, further comprising:

using the processor and the memory coupled thereto to generate an updated transaction data report from the aggregated converted batch and transaction data, and replace the transaction data report with the updated transaction data report.

4. The method of claim 1, wherein using the processor and the memory coupled thereto to generate the transaction data report comprises using the processor and the memory coupled thereto to:

retrieve the aggregated converted transaction data associated with the transaction data report from the memory; and calculate the transaction data report based upon the retrieved aggregated converted transaction data.

5. The method of claim 1, further comprising using the processor and the memory coupled thereto to provide an interactive user interface comprising the transaction data report.

6. The method of claim 1, further comprising:

using the processor and the memory coupled thereto to analyze the received transaction data from the plurality of POS terminals, determine whether additional transaction data has to be added to the received transaction data, when additional transaction data has to be added, retrieve the additional transaction data, and add the additional transaction data to the received transaction data from the plurality of POS terminals.

7. The method of claim 1, wherein using the processor and memory coupled thereto to aggregate the converted transaction data comprises using the processor and memory coupled thereto to:

sort the converted transaction data in the common format into at least one category based on at least one of a portion of converted transaction data in the common format and a portion of the received transaction data;

retrieve the sorted converted transaction data from at least one category;

calculate the aggregated converted transaction data based on the sorted converted transaction data from the at least one category;

determine whether new transaction data is received from the plurality of POS terminals; and when new transaction data is received from the plurality of POS terminals update aggregated converted transaction data to include the new data.

8. The method of claim 7, further comprising:

using the processor and memory coupled thereto to compare the aggregated converted transaction data with the new data from the plurality of POS terminals to determine if a predetermined condition is satisfied, and when the predetermined condition is satisfied, generate an alert message.

9. An electronic device for communicating a transaction data report based upon transaction data received from a plurality of point-of-sale (POS) terminals via a communications network, the POS terminals each having a POS device type from among a plurality of different POS device types and each being configured to scan a plurality of products and generate the transaction data, the electronic device comprising:

a processor and a memory coupled thereto, said memory comprising sets of translation instructions corresponding to different ones of the plurality of POS device types and configured to, in real time receive the transaction data from the plurality of POS terminals over the communications network, wherein the transaction data from each of the plurality of POS terminals is in a different POS device type format, and when the transaction data is received after each product of the plurality thereof is scanned on a per-scan basis, determine a given POS device type based upon the transaction data, convert the transaction data from each of the plurality of POS terminals to a common format using a corresponding set of translation instructions stored in said memory for the given POS device type, and aggregate the converted transaction data in the common format; and the processor and the memory to receive a request, via the communications network, for the transaction data report, the data report being associated with the aggregated converted data, and based upon the request, generate the data report from the aggregated converted transaction data.

10. The electronic device of claim 9, wherein said processor is configured to index the received transaction data into at least one category based on a portion of the received transaction data.

11. The electronic device of claim 10, wherein the processor is configured to:

retrieve the indexed transaction data from the at least one category;

calculate, for the at least one category, the aggregated converted transaction data based on the indexed transaction data of the at least one category;

determine whether new transaction data is received from the plurality of POS terminals; and when new transaction data is received from the plurality of POS terminals, update the aggregated converted transaction data to include the new transaction data.

12. The electronic device of claim 9, wherein said processor is configured to provide an interactive user interface comprising the transaction data report.

13. The electronic device of claim 9 wherein the aggregated converted transaction data is stored in said memory; and wherein said processor is configured to compare the received transaction data to the aggregated converted transaction data stored in said memory to detect occurrence of an event and based upon detecting the event, generate an alert message.

14. A method comprising:

using a processor and a memory coupled thereto to, in real time receive transaction data from a plurality of point-of-sale (POS) terminals over a communications network, the POS terminals each having a POS device type from among a plurality of different POS device types and each being configured to scan a plurality of products and generate the transaction data, the transaction data from each of the plurality of POS terminals being converted by the plurality of POS terminals from a format associated with a respective POS device type of each of the plurality of POS terminals to a common format using a corresponding set of translation instructions for the given POS device type, and the transaction data being received after each product of the plurality thereof is scanned on a per-scan basis, and aggregate the converted transaction data in the common format; and using the processor and the memory to receive a request, via the communications network from an end user, for a data report associated with the aggregated converted transaction data, based upon the request, generate a transaction data report from the aggregated converted transaction data, and transmit the transaction data report to the at least one end user via the communications network.

15. The method of claim 14, further comprising:

using the processor and the memory coupled thereto to receive a batch of transaction data from a given one of the plurality of POS terminals in the common format, aggregate the converted batch of transaction data in the common format, compare the aggregated converted batch of transaction data with the aggregated converted transaction data to determine a match, and when there is no match, aggregate the aggregated converted batch of transaction data with the aggregated converted transaction data.

16. The method of claim 15, further comprising:

using the processor and the memory coupled thereto to generate an updated transaction data report from the aggregated converted batch and transaction data, and replace the transaction data report with the updated transaction data report.

* * * * *